United States Patent
Terasawa et al.

(10) Patent No.: US 6,840,682 B2
(45) Date of Patent: Jan. 11, 2005

(54) CONNECTION UNIT, OPTICAL FIBER LINE UNIT, OPTICAL CABLE, AND OPTICAL TRANSMISSION SYSTEM

(75) Inventors: Yoshiaki Terasawa, Yokohama (JP); Toshio Oshima, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 10/365,475

(22) Filed: Feb. 13, 2003

(65) Prior Publication Data

US 2003/0156782 A1 Aug. 21, 2003

Related U.S. Application Data

(62) Division of application No. 09/685,886, filed on Oct. 11, 2000, now Pat. No. 6,533,464.

(30) Foreign Application Priority Data

Oct. 12, 1999 (JP) ........................................ P11-289739

(51) Int. Cl.[7] .............................................. G02B 6/38
(52) U.S. Cl. ........................................................ 385/59
(58) Field of Search ............................. 385/27, 28, 29, 385/42, 43, 96, 97, 98, 99

(56) References Cited

U.S. PATENT DOCUMENTS

| | | | | |
|---|---|---|---|---|
| 5,222,172 A | * | 6/1993 | Suzuki | .................. 385/96 |
| 5,301,252 A | * | 4/1994 | Yanagawa et al. | ............ 385/96 |
| 5,519,796 A | | 5/1996 | Li et al. | |
| 5,570,442 A | * | 10/1996 | Arii et al. | ..................... 385/46 |

(List continued on next page.)

FOREIGN PATENT DOCUMENTS

| | | |
|---|---|---|
| DE | 44 17 767 A1 | 11/1995 |
| EP | 0 564 133 A1 | 10/1993 |
| EP | 0 575 009 A1 | 12/1993 |
| EP | 0 890 853 A1 | 1/1999 |
| EP | 0 933 888 A2 | 8/1999 |
| FR | 2 519 152 A | 7/1983 |
| JP | 05264816 | 10/1993 |
| JP | 7-263778 | 10/1995 |
| JP | 08122531 A | 5/1996 |
| JP | 09043647 | 2/1997 |
| JP | 3052886 | 4/2000 |

OTHER PUBLICATIONS

Benner A, et al. "Low–Reflectivity In–Line Variable Attenuator Utilizing Optical Fiber Tapers." Jouranl of Lightwave Technology, IEEE, New York, US, vol. 8, No. 1, 1990, pp. 7–10, XP 000104169.

Srivastava A K, et al. "Error Free Transmission of 64 WDM 10 GB/S Channels Over 520 Km Of TruewaveFiber." Proceedings of the European Conference on Optical Communication, vol. 1, No. 1, Sep. 20, 1998, pp. 265–266, XP002116123.

(List continued on next page.)

*Primary Examiner*—Thanh-Tam Le
(74) *Attorney, Agent, or Firm*—McDermott Will & Emery LLP

(57) ABSTRACT

It is an object of this invention to provide a connection unit capable of improving transmission characteristics. The connection unit according to this invention is provided between a plurality of first optical fibers extending from an optical amplifier and a plurality of second optical fibers in an optical cable, and comprises one or more optical components to connect one first optical fiber to one second optical fiber. Each of the optical components includes third and fourth optical fibers that can be connected to one first optical fiber and one second optical fiber with low connection losses, respectively, and a loss adjusting section for adjusting a transmission loss. The transmission loss deviation in a plurality of optical transmission lines is adjusted to 0.005 dB/km or less.

3 Claims, 10 Drawing Sheets

U.S. PATENT DOCUMENTS

| | | | |
|---|---|---|---|
| 5,574,590 A | 11/1996 | Edagawa et al. | |
| 5,598,491 A | 1/1997 | Ohya et al. | |
| 5,721,635 A | 2/1998 | Shigematsu et al. | |
| 5,920,424 A | 7/1999 | Espindola et al. | |
| 5,937,126 A | 8/1999 | Yamamoto et al. | |
| 5,986,789 A | 11/1999 | Kawai et al. | |
| 6,084,993 A | 7/2000 | Mukasa | |
| 6,244,757 B1 * | 6/2001 | Kim et al. | 385/96 |
| 6,275,627 B1 * | 8/2001 | Wu | 385/28 |
| 6,327,075 B1 | 12/2001 | Ishii | |
| 6,366,718 B2 | 4/2002 | Sakuyama | |
| 6,434,295 B1 * | 8/2002 | MacCormack et al. | 385/27 |
| 6,442,315 B1 * | 8/2002 | Rhee et al. | 385/43 |

OTHER PUBLICATIONS

Holmes, J.M., Payne, F.P., Spirit, M.D.: Matching Fibres for Low Loss Coupling into Fibre Amplifiers Electronics Letters, vol. 26, No. 25, pp. 2102–2104, XP002261647.

Haas, Z., Santoro, M.: "A Mode Filtering Scheme for Improvement of the Bandwidth Distance Product in Multimide Fiber Systems" IEEEJ. of Lightwave Tech., vol. 11, No. 7, pp. 1125–1131, XP002261648.

* cited by examiner

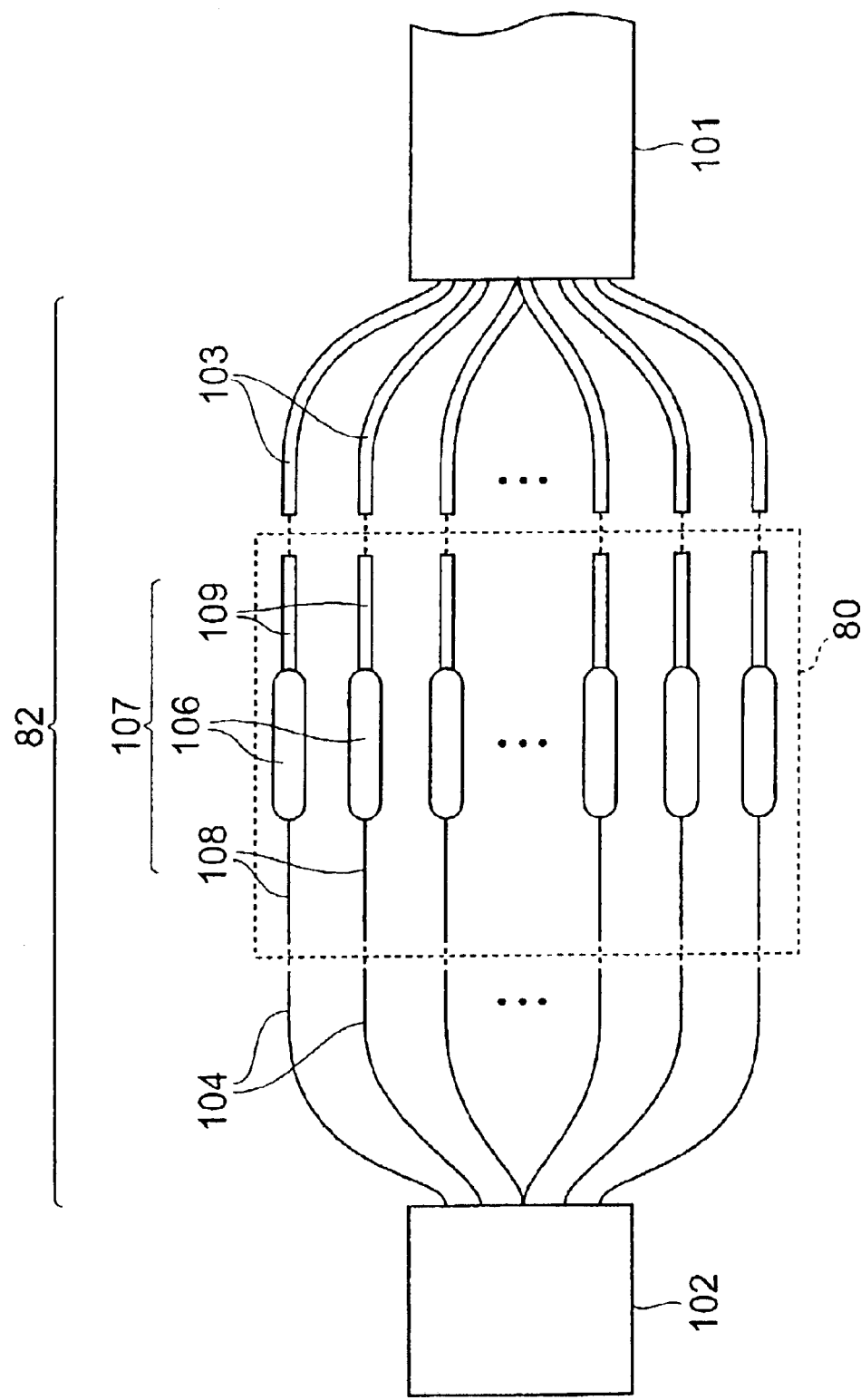

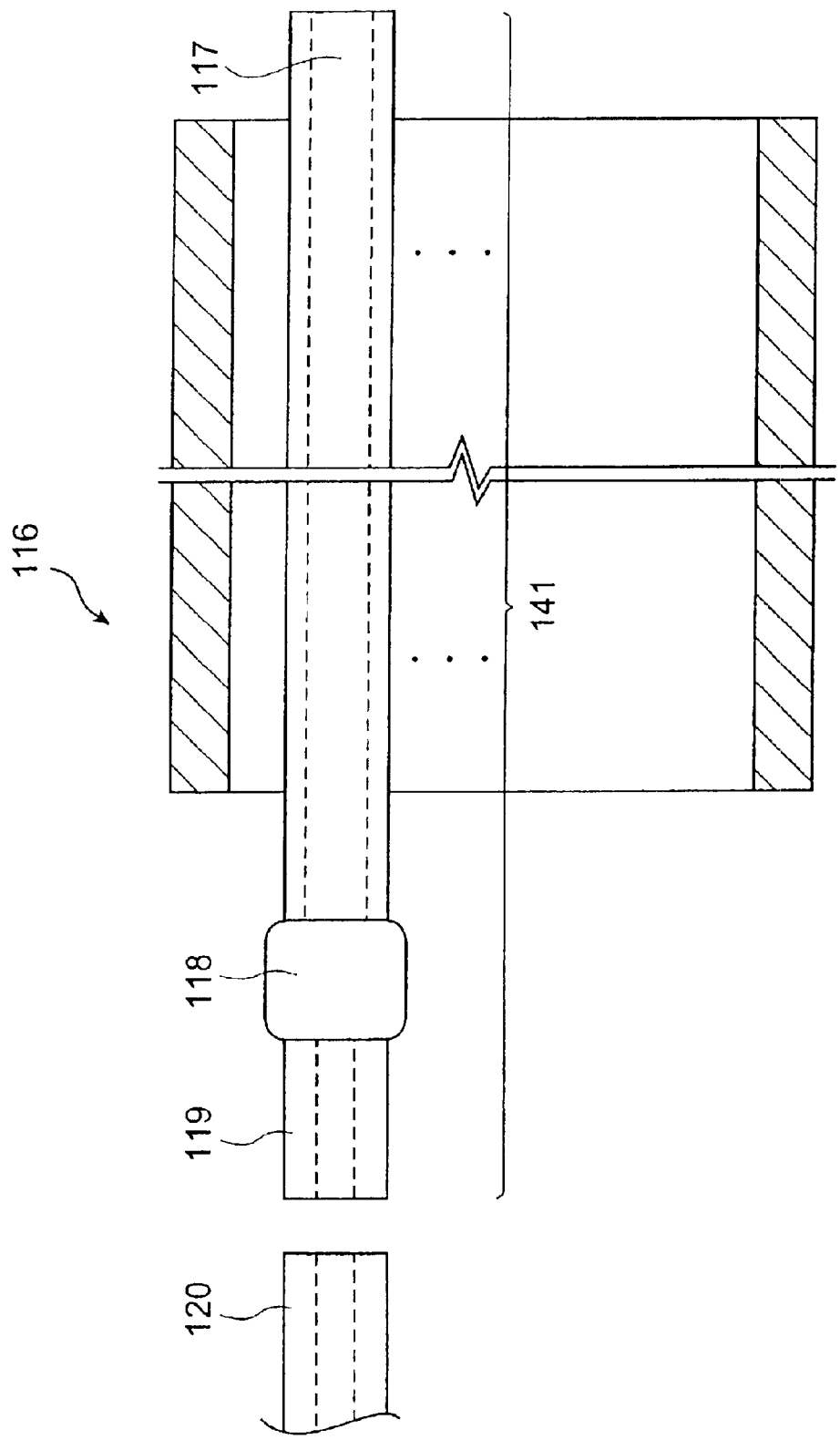

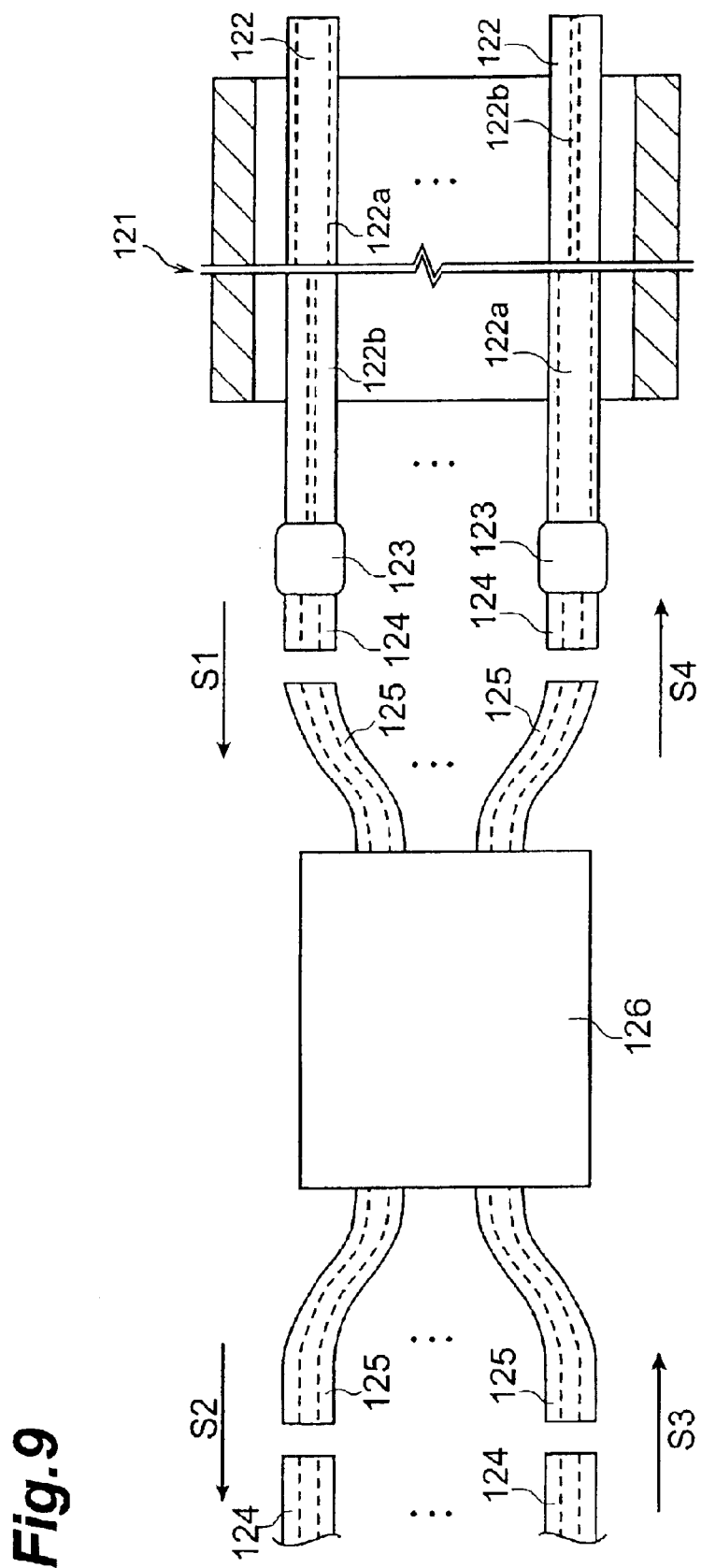

CONNECTION UNIT, OPTICAL FIBER LINE UNIT, OPTICAL CABLE, AND OPTICAL TRANSMISSION SYSTEM

This application is a divisional of application Ser. No. 09/685,886 filed Oct. 11, 2000 now U.S. Pat. No. 6,533,464.

BACKGROUND OF THE INVENTION

1. Field of the Invention

The present invention relates to a connection unit provided between an optical amplifier and optical cable, an optical fiber line unit accommodated in an optical cable, an optical cable, and an optical transmission system including an optical cable and optical amplifier.

2. Related Background Art

In a submarine optical cable or the like, to transmit optical signals over a long distance, repeaters are provided at predetermined distance intervals (about 90 km at maximum; about 50 km in general) to amplify a weakened optical signal.

An optical cable has a plurality of optical fiber lines in an optical cable sheath portion, and the plurality of optical fiber lines are respectively connected to a plurality of optical fibers extending from an optical amplifier (to be also referred to as an optical amp hereinafter) mounted in each repeater. A plurality of optical signals propagating through the plurality of optical fiber lines collectively strike the optical amp via the plurality of optical fibers extending from the optical amp to be collectively amplified.

SUMMARY OF THE INVENTION

The present inventors have found the following problems upon examining the above conventional technique. An optical amp has a so-called gain tilt property, i.e., the property of having different gains depending on the wavelengths of incident optical signals. This gain tilt changes depending on the power of an incident optical signal. FIG. 11 shows how the gain tilt changes depending on the incident power. Referring to FIG. 11, reference symbol P1 denotes the direction in which the incident power decreases; and P2, the direction in which the incident power increases. As shown in FIG. 11, when the incident power is low, the gain on the long-wavelength side is higher than that on the short-wavelength side, and vice versa.

In this case, signals having various wavelengths are transmitted through each optical fiber line owing to WDM (Wavelength Division Multiplex) transmission. Consequently, signals vary in power depending on the wavelengths due to the gain tilt, and the transmission characteristics deteriorate.

In this case, it is relatively easy to correct a gain tilt with respect to one incident light beam. However, optical signals propagating through the respective optical fiber lines are collectively incident on the optical amp. Since the respective incident optical signals have propagated through a plurality of optical fiber lines with different transmission losses (e.g., losses in the optical fibers themselves or losses due to side pressures and bending), the powers of the respective optical signals differ from each other. If the deviations among transmission losses in the respective optical fiber lines are large, the deviations among the powers of the incident light beams are large. Therefore, gain tilts with respect to a plurality of optical signals vary, and it is difficult to suppress the gain tilts with respect to all optical signals to a predetermined value or less, resulting in a deterioration in transmission characteristics.

In a submarine optical cable, in particular, since optical amplification is performed by optical amps on the respective optical fiber lines at predetermined distance intervals, if the deviations among transmission losses in the respective optical fiber lines are large, the gain tilt increases every time each optical signal passes through an optical amp. This greatly affects the transmission characteristics.

It is therefore an object of the present invention to provide a connection unit, optical fiber line unit, optical cable, and optical transmission system which can improve transmission characteristics.

A connection unit according to the present invention is provided between a plurality of first optical fibers extending from an optical amplifier and a plurality of second optical fibers in an optical cable. The connection unit comprises at least one optical component to connect one first optical fiber selected from the plurality of first optical fibers to one second optical fiber selected from the plurality of second optical fibers. Each of the optical components comprises a third optical fiber that can be connected to the selected first optical fiber with a low connection loss, a fourth optical fiber that can be connected to the selected second optical fiber with a low connection loss, and a loss adjusting section for adjusting a transmission loss of an optical transmission line including the selected first and second optical fibers. The connection unit adjusts a difference between a highest transmission loss and a lowest transmission loss among transmission losses in a plurality of optical transmission lines each including one of the plurality of first optical fibers and one of the plurality of second optical fibers to not more than 0.005 dB/km.

Since the connection unit can adjust the deviation among the transmission losses in a plurality of optical transmission lines to 0.005 dB/km or less, the powers of a plurality of optical signals incident on the optical amplifier can be almost equalized. This makes it possible to suppress the influences of the gain tilts and improve the transmission characteristics.

The connection unit according to the present invention may be characterized in that the loss adjusting section of the optical component includes a connection portion between the third and fourth optical fibers, and the transmission loss is adjusted by a connection loss at the connection portion.

The connection unit according to the present invention may be characterized in that the third and fourth optical fibers of the optical component are fusion-spliced to each other at the connection portion, and a central axis of a core portion of the third optical fiber is offset from a central axis of a core portion of the fourth optical fiber at the connection portion.

The connection unit according to the present invention may be characterized in that the third and fourth optical fibers of the optical component are fusion-spliced to each other, and a core portion of at least one of the third and fourth optical fibers is enlarged at the connection portion.

The connection unit according to the present invention may be characterized in that the loss adjusting section of the optical component includes a bent portion formed on at least one of the third and fourth optical fibers, and the transmission loss is adjusted by a bending loss at the bent portion.

The connection unit according to the present invention may be characterized in that the loss adjusting section of the optical component includes an optical attenuator, and the transmission loss is adjusted by the optical attenuator.

An optical fiber line unit according to the present invention comprises a plurality of optical fibers accommodated in an optical cable sheath portion and constituting an optical cable together with the optical cable sheath portion, each of the optical fiber lines having a length of not less than 30 km. Each of the optical fiber lines is formed by connecting a plurality of optical fibers. A difference between a highest transmission loss and a lowest transmission loss among transmission losses in the optical fiber lines is not more than 0.005 dB/km.

According to this optical fiber line unit, since the difference between transmission losses in a plurality of optical fiber lines is 0.005 dB/km or less, the powers of a plurality of optical signals incident on the optical amplifier are almost equalized. This makes it possible to suppress the influences of gain tilts and improve the transmission characteristics.

An optical cable according to the present invention is constituted by a plurality of optical transmission lines each including an optical fiber line having a first mode field diameter. At least one of the plurality of optical transmission lines includes an optical fiber connected to one end of the optical fiber line and having a second mode field diameter smaller than the first mode field, and a loss adjusting section for adjusting an overall transmission loss in the selected optical transmission line including the optical fiber line and the optical fiber. A difference between a highest transmission loss and a lowest transmission loss among transmission losses in the plurality of optical transmission lines is not more than 0.005 dB/km.

An optical cable according to the present invention is constituted by a plurality of optical transmission lines each including an optical fiber line having a portion having, a first mode field diameter and a portion having a second mode field diameter larger than the first mode field diameter. At least one optical transmission line selected from the plurality of optical transmission lines includes an optical fiber connected to one end of the optical fiber line and having a third mode field diameter larger than the first mode field diameter and smaller than the second mode field diameter, and a loss adjusting section for adjusting an overall transmission loss in the selected optical transmission line including the optical fiber line and the optical fiber. A difference between a highest transmission loss and a lowest transmission loss among transmission losses in the plurality of optical transmission lines is not more than 0.005 dB/km.

In this optical cable, since the deviation between the transmission losses in a plurality of optical transmission lines is 0.005 dB/km or less, the powers of a plurality of optical signals incident on the optical amplifier are almost equalized to suppress the influences of gain tilts, and the transmission characteristics can be improved.

An optical transmission system according to the present invention comprises an optical cable having a plurality of optical fiber lines, an optical amplifier, and a plurality of optical fibers extending from the optical amplifiers At least one of optical transmission lines including one optical fiber line selected from the plurality of optical fiber lines and one optical fiber selected from the plurality of optical fibers includes a loss adjusting section for adjusting a difference between a highest transmission loss and a lowest transmission loss among transmission losses in the plurality of optical transmission lines to not more than 0.005 dB/km.

In this optical transmission system, since the deviation between the transmission losses in a plurality of optical transmission lines can be adjusted to 0.005 dB/km or less, the powers of a plurality of optical signals incident on the optical amplifier are almost equalized to suppress the influences of gain tilts, and the transmission characteristics can be improved.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2 is a side view showing an embodiment of a connection unit according to the present invention;

FIG. 7 is a side sectional view showing an embodiment of an optical cable according to the present invention;

FIG. 9 is a side view showing the connection state between the optical cable and the optical amplifier in FIG. 8;

DESCRIPTION OF THE PREFERRED EMBODIMENTS

In the following, preferred embodiments of a connection unit, optical fiber line unit, optical cable, and optical transmission system in accordance with the present invention will be explained in detail with reference to the accompanying drawings. Here, constituents identical to each other will be referred to with numerals identical to each other, without repeating their overlapping explanations.

Figure 1A:
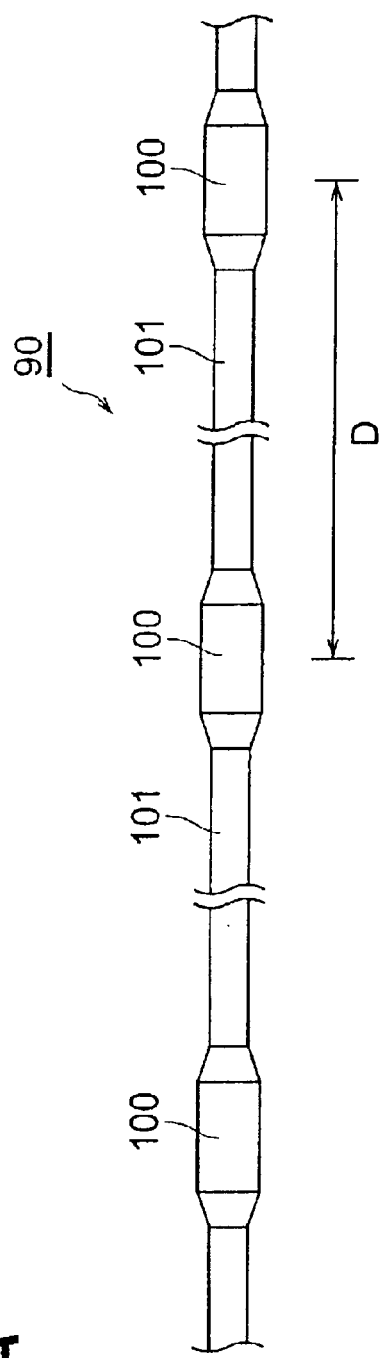
FIG. 1A is a side view of an optical transmission system.
Figure 1B:
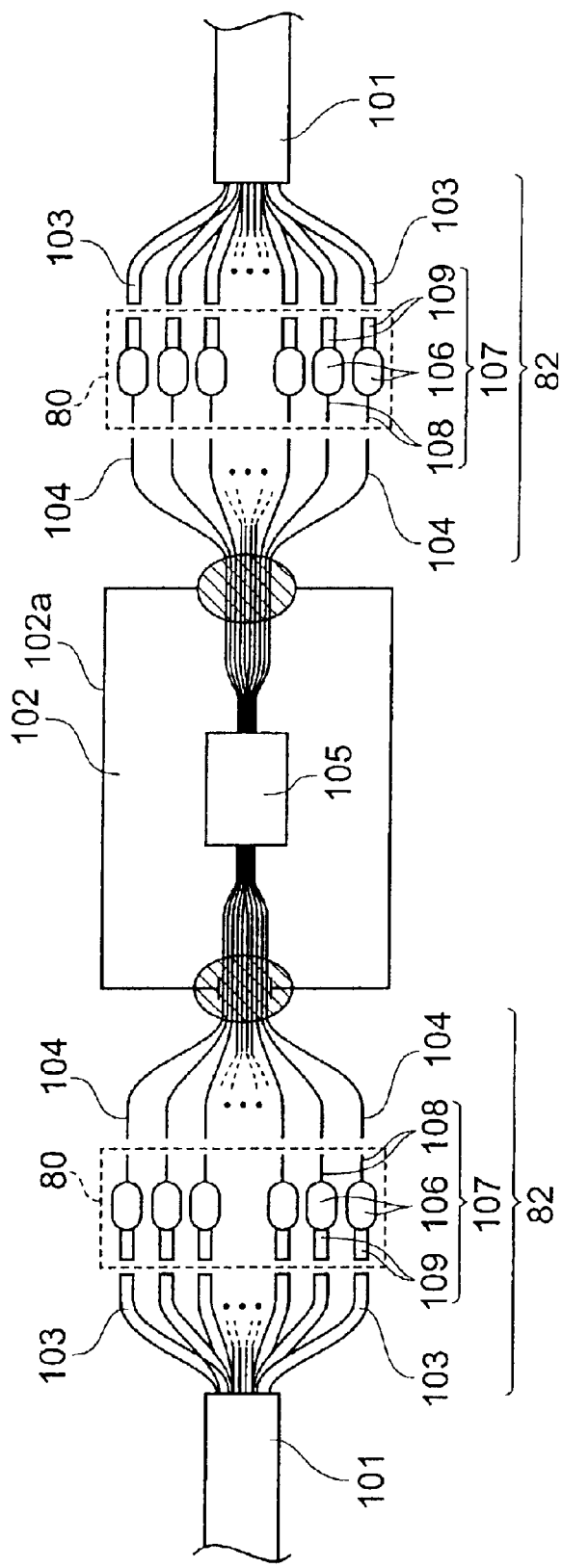
FIG. 1B is a schematic view for explaining the connection state between an optical cable and an optical amplifier.

The connection unit, optical fiber line unit, optical cable, and optical transmission system according to this embodiment can be suitably used for a submarine optical transmission system or the like. As shown in FIG. 1A, in an optical cable 101 of an optical transmission system 90 such as a submarine optical transmission system, in order to transmit an optical signal for a long distance, repeaters 100 are provided at predetermined distance D (about 90 km at maximum; about 50 km in general) intervals to amplify a weakened optical signal. As shown in FIG. 1B, each repeater 100 incorporates an optical amplifier (to be also referred to as an optical amp hereinafter) 102. An optical signal is amplified by this optical amp 102.

FIG. 1B schematically shows the connection state between the optical amp 102 and optical fibers 103 in the optical cable 101. Each optical fiber 103 in the optical cable 101 is connected to a corresponding one of a plurality of optical fibers 104 extending from the optical amp 102 via a connection unit 80 according to this embodiment. Optical signals propagating from the plurality of optical fibers 103 in the optical cable 101 to the plurality of optical fibers 104 via the connection unit 80 are multiplexed into one signal by an optical coupler or the like and collectively amplified by an amplifying section 105 of the optical amp 102. The amplified optical signal is demultiplexed into signals by an optical coupler or the like. These signals are then transmitted to a plurality of optical fibers 103 in an optical cable 101 on the opposite side via an connection unit 80.

In this case, the optical fibers 104 extending from the optical amp 102 are welded to a pressure barrier 102a of the optical amp 102. For this reason, each optical fiber 104 is required to have heat resistance and resistance to bending. To realize heat resistance, polyimide resin or the like is used for the sheath of the optical fiber 104. A metal is evaporated on the surface of the sheath of the optical fiber 104 to improve its joining property in welding. The optical fiber 104 is also required to have resistance to bending stress produced by, for example, welding to the pressure barrier 102a. An optical fiber having a small mode field diameter (to be also referred to as an MFD hereinafter) is superior in resistance to bending to an optical fiber having a large MFD. As the optical fiber 104, therefore, an optical fiber having a small MFD is preferably used.

In contrast to this, as each optical fiber 103 in the optical cable 101, an optical fiber having a relatively large MFD is preferably used to avoid a nonlinear phenomenon. In the nonlinear phenomenon, as the intensity of light increases, distortion occurs. In order to suppress this phenomenon, an increase in the power density of an optical signal is preferably suppressed. To decrease the power density by spreading the light within a cross section, an optical fiber having a large MFD is preferably used. That is, the performance required for the optical fiber 103 in the optical cable 101 differs from the performance required for the optical fiber 104 extending from the optical amp 102. Different types of optical fibers are therefore used for them.

In the optical transmission system 90 having the above arrangement, in order to decrease the transmission loss by suppressing variations in gain tilt between the respective optical transmission lines, it is preferable that the powers of light striking the optical amp be almost equalized. If the powers of light propagating through all the optical transmission lines and striking the optical amp are almost equal, almost equal gain tilts are produced in all the optical transmission lines. This makes it easy to correct the gain tilts (which need not be corrected in some case). The connection unit, optical fiber line unit, optical cable, and optical transmission system according to this embodiment are suitably used to almost equalize the powers of light incident on the optical amp.

The connection unit provided between the optical fibers in the optical cable and the optical fibers extending from the optical amplifier (optical amp) will be described first.

As described above, since the performance required for the optical fiber 103 in the optical cable 101 differs from that for the optical fiber 104 extending from the optical amp 102, optical fibers of different types (MFDS) are used for them. It is difficult to connect optical fibers having different MFDs to each other and adjust the connection loss at the connection portion. In constructing a submarine optical transmission system, in particular, since optical amps are connected to optical cables on a cable-laying ship, it is difficult to adjust the connection losses at the connection portions.

As shown in FIG. 2, therefore, the connection units 80 each having one or more optical components 107 are provided between the plurality of first optical fibers 104 extending from the optical amp 102 and the plurality of second optical fibers 103 in the optical cables 101 to almost equalize the powers of light propagating through the respective optical transmission lines 82, each including the first optical fibers 104 and second optical fibers 103, and striking the optical amp 102. Each optical component 107 of the connection unit 80 includes a third optical fiber 108 that can be connected to one first optical fiber 104 with a low connection loss and a fourth optical fiber 109 that can be connected to one optical fiber 103 with a low connection loss.

In this case, "can be connected to, . . . , with a low connection loss" indicates that the connection loss does not increase even if optical fibers are connected by general fusion splicing. More specifically, this connection can be done like connection between optical fibers of the same type or optical fibers having the same MFD.

A loss adjusting section 106 is formed between each third optical fiber 108 and the corresponding fourth optical fiber 109. The loss adjusting section 106 adjusts the transmission loss in the optical transmission line 82 including the first optical fiber 104 and second optical fiber 103.

By using the connection unit 80 having one or more optical components 107 described above, the powers of optical signals incident on the optical amp 102 can be almost equalized. More specifically, if the power of light emerging from a given optical transmission line 82 is higher than that from another optical transmission line 82, the optical component 107 that is adjusted in advance to increase the transmission loss is provided between the first optical fiber 104 and the second optical fiber 103, and the two optical transmission lines are connected to each other. In contrast to this, for the optical transmission line 82 from which light having a power lower than that from another optical transmission line 82 emerges, the optical component 107 that is adjusted in advance to decrease the transmission loss is provided between the first optical fiber 104 and the second optical fiber 103, and the two optical transmission lines are connected to each other.

In this case, the optical components 107 need not be provided for all the optical transmission lines 82, and the optical component 107 may be used for only the optical transmission line 82 from which light having a very high power emerges. In this sense, it suffices if the connection unit 80 includes "one or more optical components".

This connection unit 80 controls the difference between the highest transmission loss and the lowest transmission loss among the transmission losses in the plurality of optical transmission lines 82, i.e., the transmission loss deviation, to 0.005 dB/km or less, and more preferably, 0.002 dB/km or less. With this operation, the powers of light incident on the optical amp 102 can be equalized, and variations in gain tilt are suppressed, thus improving the transmission characteristics. Note that, as described above, connection between the first optical fiber 104 and the third optical fiber 108 and between the second optical fiber 103 and the fourth optical fiber 109 is connection with a low transmission loss (e.g., connection between optical fibers of the same type) and hence hardly influence transmission loss adjustment by the loss adjusting section 106 described above. Alternatively, some consideration can be given to the influence of the connection.

A few specific examples of the loss adjusting section 106 in the optical component 107 described above will be presented.

Figure 3A:
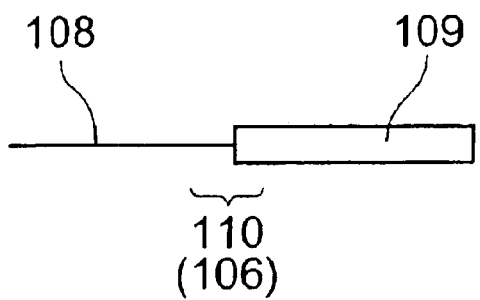
FIG. 3A is a side view showing an example of an optical component.
Figure 3B:
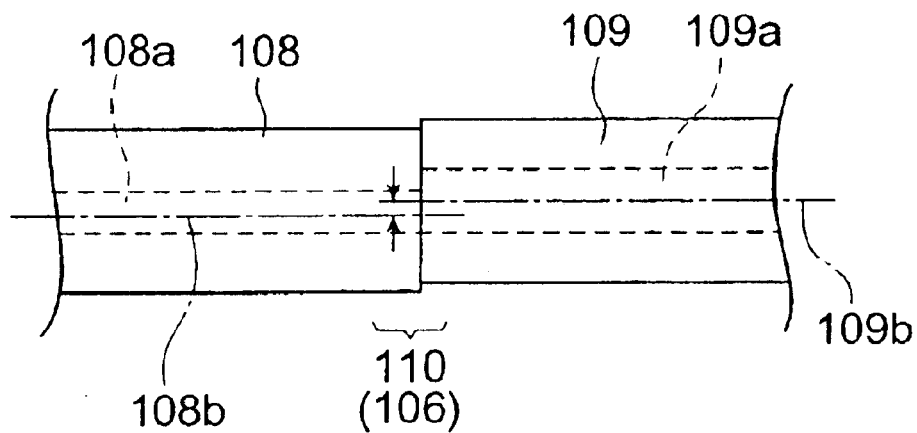
FIGS. 3B and 3C are side views showing an example of the connection portion of the optical component.

As shown in FIG. 3A, a case wherein the loss adjusting section 106 has a connection portion 110 between the third optical fiber 108 and the fourth optical fiber 109 will be described first. In this case, the transmission loss in the optical transmission line 82 is adjusted by the connection loss at the connection portion 110. When the transmission loss in the optical transmission line 82 is to be adjusted by the connection loss at the connection portion 110, the third optical fiber 108 and the fourth optical fiber 109 are preferably axially shifted at the connection portion 110.

More specifically, the third optical fiber 108 is preferably welded to the fourth optical fiber 109 while a central axis 108b of a core portion 108a of the third optical fiber 108 is shifted from a central axis 109b of a core portion 109a of the fourth optical fiber 109. In this case, the connection loss can be increased by increasing the axial shift amount, and vice versa.

Figure 3C:
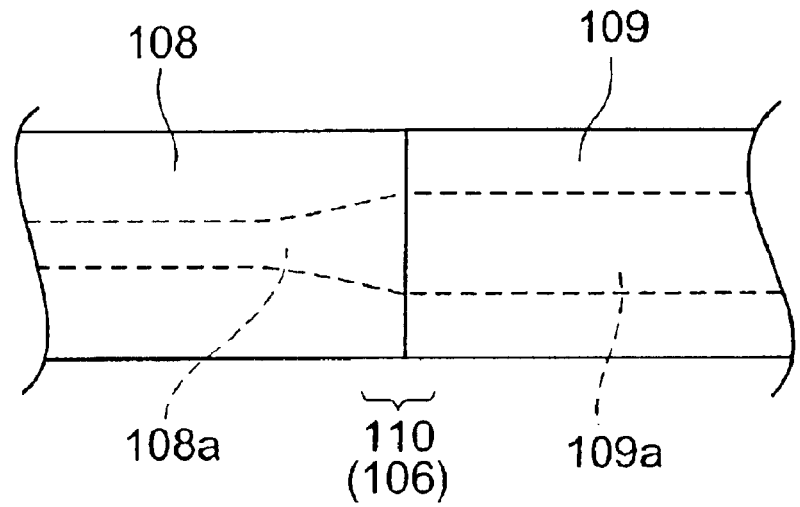

Alternatively, when the transmission loss in the optical transmission line 82 is to be adjusted by the connection loss at the connection portion 110, at least one of the core portions of the third and fourth optical fibers 108 and 109 is preferably enlarged. In the case shown in FIG. 3C, the core portion 108a of the third optical fiber 108 is enlarged. When one of the core portions of the third and fourth optical fibers 108 and 109 is to be enlarged, the connection loss can be increased by increasing the diameter deviation of the core portion, and vice versa.

Figure 4A:
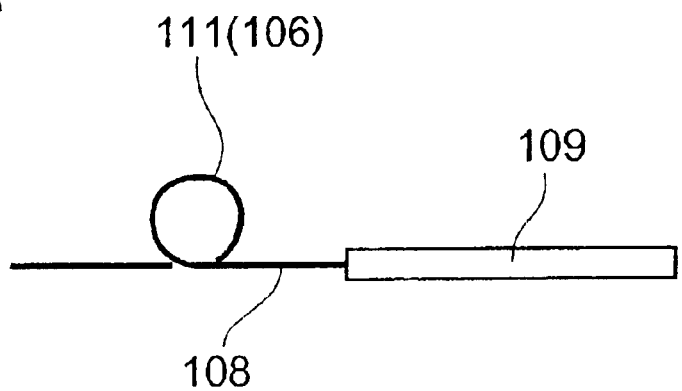
FIGS. 4A and 4B are side views showing an example of the optical component.
Figure 4B:
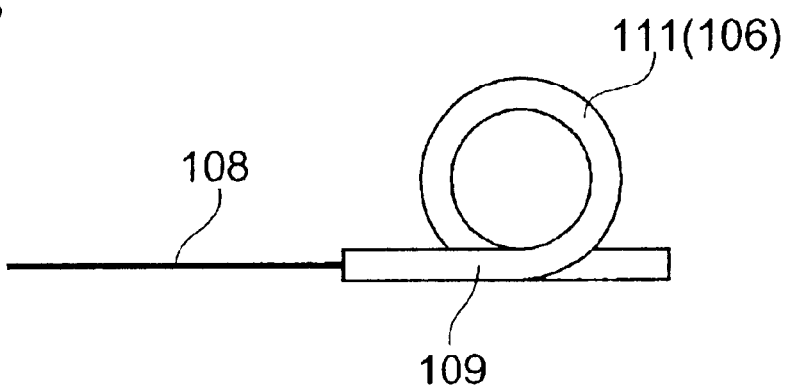
Figure 5:
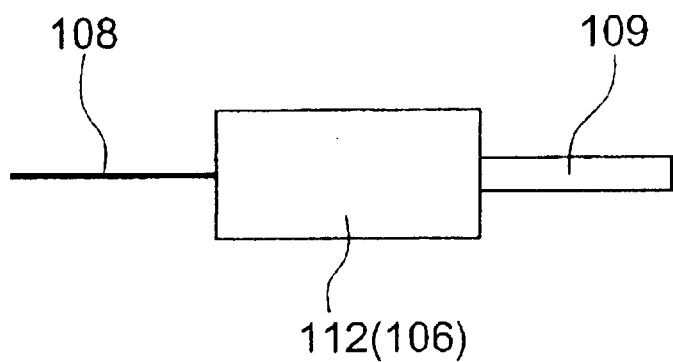
FIG. 5 is a side view showing an example of the optical component.

The transmission loss in the optical transmission line 82 may be adjusted by the bending loss at a bent portion 111 of the loss adjusting section 106 instead of the connection loss at the connection portion 110 of the loss adjusting section 106, as shown in FIGS. 4A and 4B. This bent portion 111 may be formed on the third optical fiber 108 as shown in FIG. 4A or on the fourth optical fiber 109 as shown in FIG. 4B. When the transmission loss in the optical transmission line 82 is to be adjusted by the bent portion 111, the shape of the bent portion 111 is preferably maintained by using an ultraviolet-curing resin or the like. In this case, the bent portion 111 may be fixed while being wound on a mandrel, or the mandrel may be removed after the bent portion is fixed.

The transmission loss in the optical transmission line 82 may be adjusted by an optical attenuator 112 of the loss adjusting section 106 instead of the connection loss and the bending loss.

An optical fiber line unit capable of improving transmission characteristics will be described next.

Figure 6A:
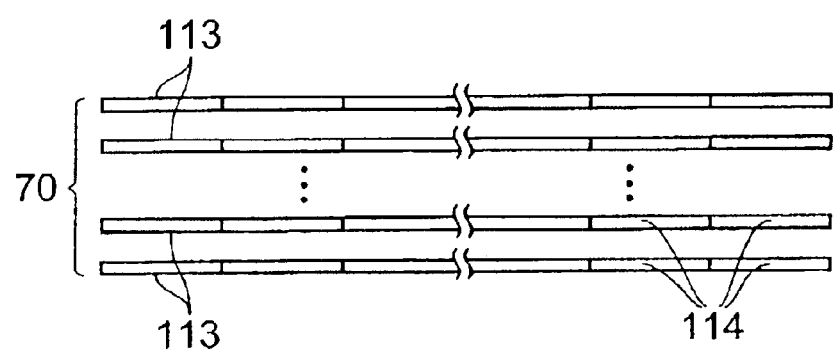
FIG. 6A is a side view showing an embodiment of an optical fiber line unit according to the present invention.
Figure 6B:
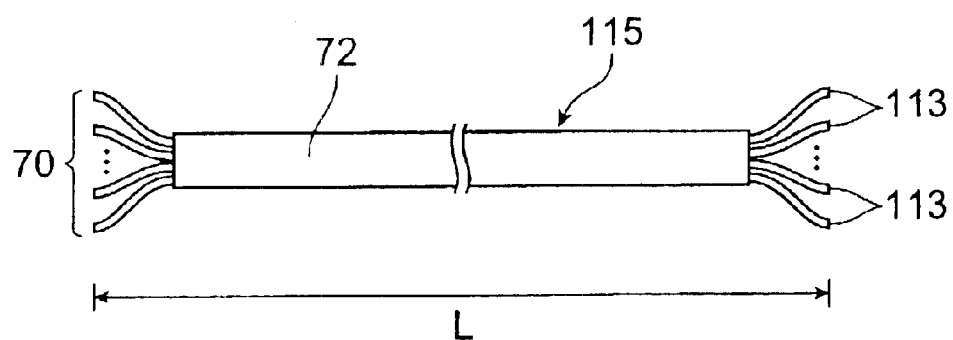
FIG. 6B is a side view showing an optical cable having an optical fiber line unit according to the present invention.

An optical fiber line unit 70 is a set of optical fiber lines 113. This set is prepared to be accommodated in an optical cable sheath portion 72. As shown in FIGS. 6A and 6B, each optical fiber line 113 is formed by connecting a plurality of optical fibers 114 to each other and has a length L of 30 km or more. It is very difficult to manufacture a unitary optical fiber having a length of 30 km or more. For this reason, in manufacturing an optical cable 115, each optical fiber line 113 is formed by connecting a plurality of optical fibers 114 to each other.

In this optical fiber line unit 70, the difference between the highest transmission loss and the lowest transmission loss among the transmission losses in all the optical fiber lines 113, i.e., the transmission loss deviation, is set to 0.005 dB/km or less, and more preferably, 0.002 dB/km or less. In other words, the optical fibers 114 are selected and connected (the connection losses in the process of connection are also adjusted as needed) so as to set the transmission loss deviation to 0.005 dB/km or less, and more preferably, 0.002 dB/km or less. Alternatively, the connection losses in connecting the optical fibers 114 to each other are adjusted to set the transmission loss deviation to 0.005 dB/km or less, and more preferably, 0.002 dB/km or less. If the optical cable 115 is manufactured by using this optical fiber line unit 70, the transmission losses in all the optical fiber lines 113 can be almost equalized. This will contribute to equalization of the powers of light incident on each optical amp.

The gain tilts produced in optical amps depend on the characteristics of erbium-doped fibers used for the optical amps, and hence generally vary depending on the optical amps. If, however, the transmission loss deviation in the plurality of optical fiber lines 113 described above is set to 0.005 dB/km or less, and preferably, 0.002 dB/km or less, changes in optical signals due to the gain tilts can be suppressed to a level at which the transmission characteristics are not influenced. If the above transmission loss deviation exceeds 0.005 dB/km, the gain tilts may affect the transmission characteristics.

An optical cable that can improve transmission characteristics will be described next.

FIG. 7 shows the arrangement of the first optical cable. This optical cable 116 is made up of a plurality of optical transmission lines 141 each including an optical fiber line 117 having a predetermined MFD (D1) (FIG. 7 shows only one optical transmission line 141). The plurality of optical transmission lines 141 are accommodated in an optical cable sheath portion 116a. At least one of the optical transmission lines 141 is connected to an optical fiber 119 having an MFD (D2) smaller than the MFD (D1) (D2<D1) of the optical fiber line 117 via a loss adjusting section 118 formed at one end of the optical fiber line 117. This optical fiber 119 can be connected to an optical fiber 120 extending from an optical amp with a low connection loss. Note that the loss adjusting section 118 has the same arrangement as that of the loss adjusting section 106 described with reference to FIGS. 2, 3A, 3B, 3C, 4A, 4B, and 5.

The optical fiber of the optical fiber line 117 included in the optical transmission line 141 has a relatively larger MFD to suppress a nonlinear phenomenon. On the other hand, the optical fiber 120 extending from the optical amp is welded to a pressure barrier, and hence has a relatively small MFD to reduce transmission loss due to bending. When optical fibers having different MFDs are connected to each other, the connection loss becomes large and unstable. This makes it difficult to obtain a desired transmission loss. For this reason, the loss adjusting section 118 is set in at least one optical transmission line 141 to adjust the transmission loss to set the difference between the highest transmission loss and the lowest transmission loss among the transmission losses in the plurality of optical transmission lines 141, i.e., the transmission loss deviation, to 0.005 dB/km or less, and more preferably, 0.002 dB/km or less.

In this manner, the transmission characteristics can be improved by almost equalizing the transmission losses in the optical transmission lines 141 as described in association with the connection unit 80.

Figure 8:
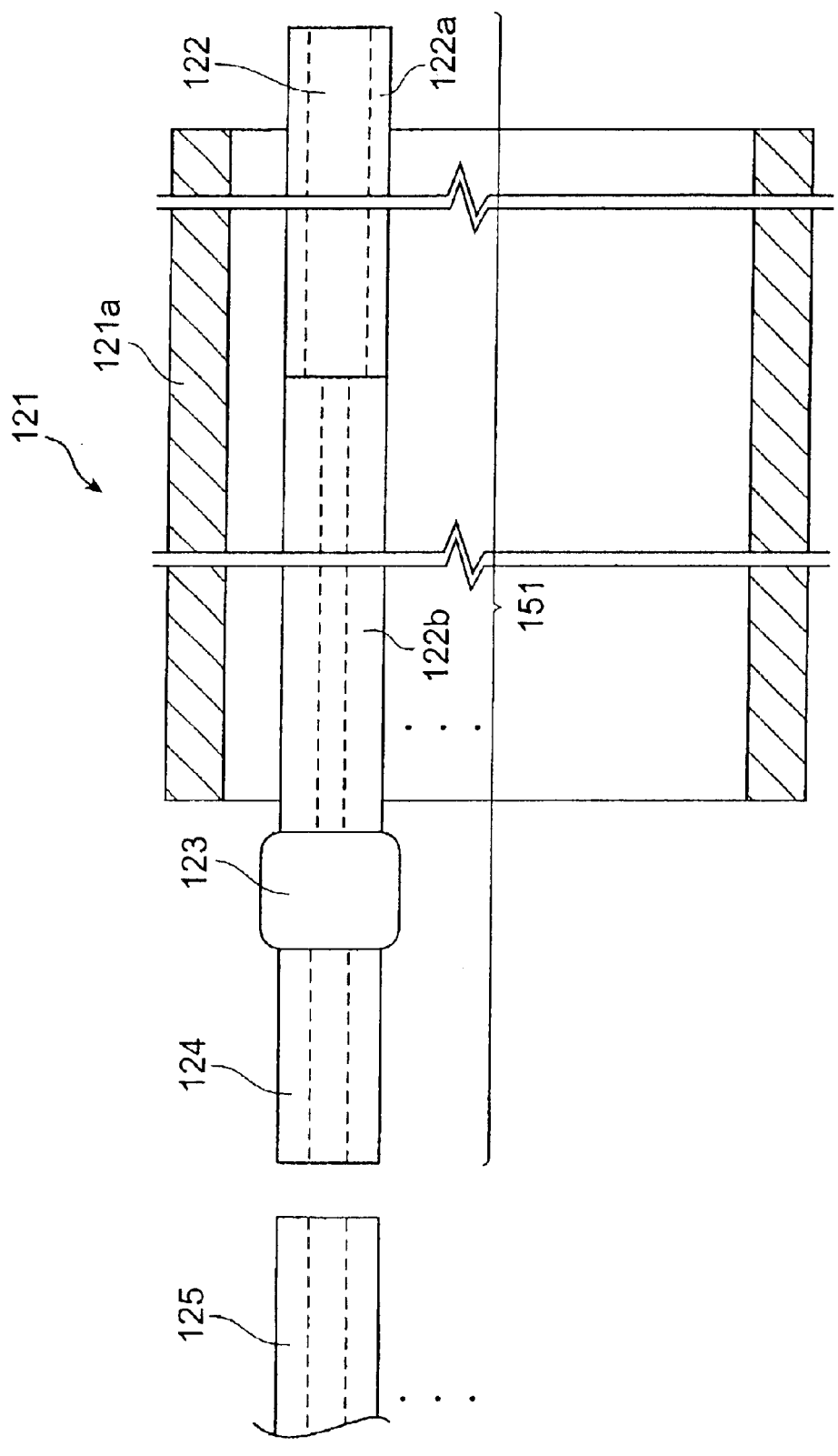
FIG. 8 is a side sectional view showing another embodiment of an optical cable according to the present invention.

FIG. 8 shows the arrangement of the second optical cable. This optical cable 121 is comprised of a plurality of optical transmission lines 151 each including an optical fiber line 122 having two portions having different MFDs (FIG. 8 shows only one optical transmission line 151). These optical transmission lines 151 are accommodated in an optical cable sheath portion 121a. In this case, an optical fiber 122a having a large MFD is set on the incident side of the optical fiber line 122, and an optical fiber 122b having a smaller optical fiber is set on the exit side. A nonlinear phenomenon is reduced by the optical fiber 122a having a relatively larger MFD (D3). The transmission speed is increased by combining this optical fiber 122a with the optical fiber 122b, which has a relatively small MFD (D4) but reduces the dispersion tilt (at which the wavelength dispersion of the optical fiber changes depending on the wavelength).

At least one of the optical transmission lines 151 is connected to an optical fiber 124 having an MFD (D5) larger than the MFD (D4) of the optical fiber 122b and smaller than the MFD (D3) of the optical fiber 122a (D4<D5<D3) via a loss adjusting section 123 connected to one end (the exit side connected to the optical amp) of the optical fiber line 122. This optical fiber 124 can be connected to an optical fiber 125 extending from the optical amp with a low connection loss. Note that this loss adjusting section 123 also has the same arrangement as that of the loss adjusting section 106 shown in FIGS. 2, 3A, 3B, 3C, 4A, 4B, and 5.

As described above, the MFD of the optical fiber 125 extending from the optical amp cannot be increased in order to prevent a bending loss by welding at the pressure barrier. In addition, in the optical fiber 125 extending from the optical amp, when light strikes the optical amp, a nonlinear phenomenon is small because the optical power is sufficiently attenuated. When, however, light emerges from the optical amp, the optical power is strong. For this reason, in order to reduce the nonlinear phenomenon, the MFD of the optical fiber 125 is not preferably decreased either. Therefore, the nonlinear phenomenon can be reduced and the transmission characteristics can be improved by setting the MFD (D5) of the optical fiber 125 to be larger than the MFD (D4) of the optical fiber 122b and smaller than the MFD (D3) of the optical fiber 122a and setting the MFD of the optical fiber 124 to be equal to the MFD (D5) of the optical fiber 125. Note that the optical fiber 124 can be connected to the optical fiber 125 extending from the optical amp with a low connection loss (for example, optical fibers of the same type are connected), and hence hardly influence the adjustment of transmission loss by the loss adjusting section 123 (or the influence on the adjustment can be considered in advance).

FIG. 9 shows a state wherein the above optical cable 121 is connected to an optical amp 126. FIG. 9 shows only two of a plurality of optical transmission lines 151 in the optical cable 121. In one of the optical transmission lines 151 shown in FIG. 9 (the upper optical transmission line in FIG. 9), an optical signal is transmitted in the direction indicated by arrows S1 and S2 in FIG. 9. In the other optical transmission line (the lower optical transmission line in FIG. 9), an optical signal is transmitted in the direction indicated by arrows S3 and S4 in FIG. 9.

In this case, the loss adjusting section 123 described above is set in each optical transmission line 151. The difference between the highest transmission loss and the lowest transmission loss among the transmission losses in the plurality of optical transmission lines 151, i.e., the transmission loss deviation, is set to 0.005 dB/km or less, and more preferably, 0.002 dB/km or less to equalize the powers of optical signals incident on the optical amp 126. In addition, in each optical transmission line 151 in the optical cable 121, the optical fiber 122a having the larger MFD (D3) is provided on the incident side, and the optical fiber 122b having the small MFD (D4) is provided on the exit side to have excellent transmission characteristics, as described above. The optical fiber 125 has the MFD (D5) larger than the MFD (D4) of the optical fiber 122b and smaller than the MFD (D3) of the optical fiber 122a. The MFD of the optical fiber 124 is equal to the MFD (D5) of the optical fiber 125. This makes it possible to reduce the nonlinear phenomenon caused by a high-power optical signal emerging from the optical amp 126.

An optical transmission system capable of improving transmission characteristics will be described next.

The optical transmission system described below is comprised of an optical cable and optical amp. As described above, in this optical transmission system, the transmission characteristics may deteriorate due to a gain tilt. As also described above, in order to suppress the adverse effect of this gain tilt, the transmission characteristics can be improved by using the connection unit 80 including the optical component 107 having the loss adjusting section 106, which is shown in FIGS. 2, 3A, 3B, 3C, 4A, 4B, and 5. The optical transmission system having this connection unit 80 between an optical cable and an optical amp can improve its transmission characteristics.

Figure 10A:
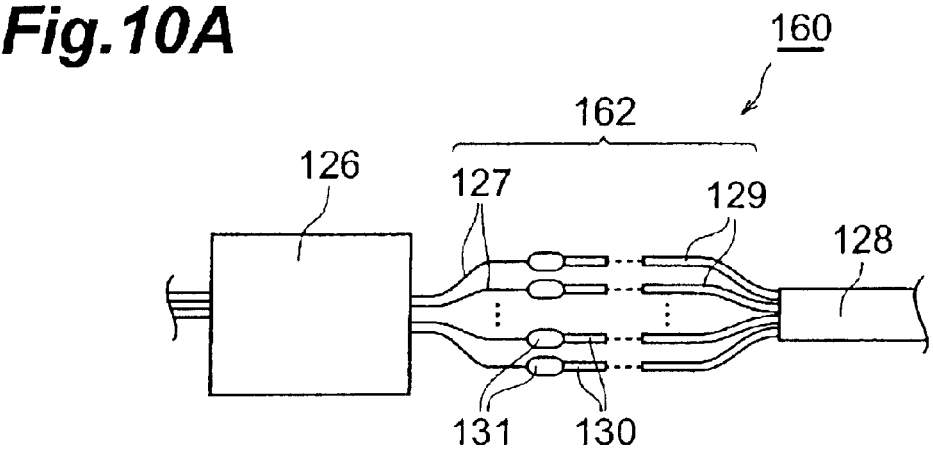
FIGS. 10A, 10B, and 10C are side views showing an embodiment of an optical transmission system according to the present invention in only a partial section.
Figure 10B:
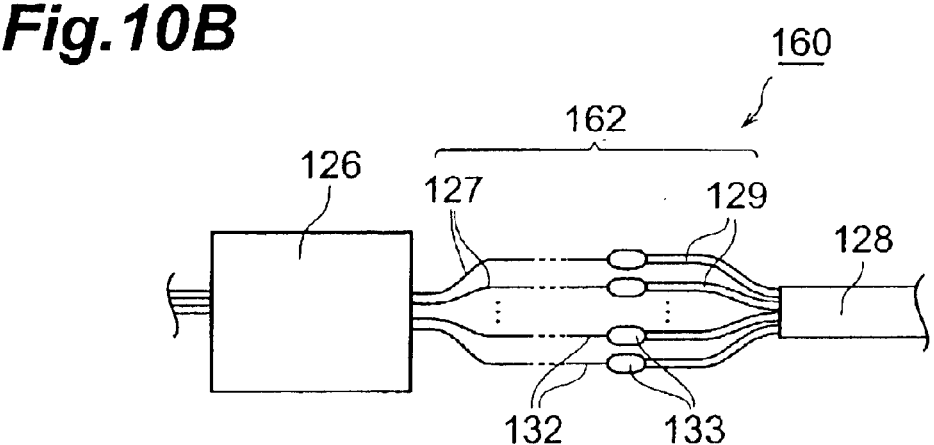
Figure 10C:
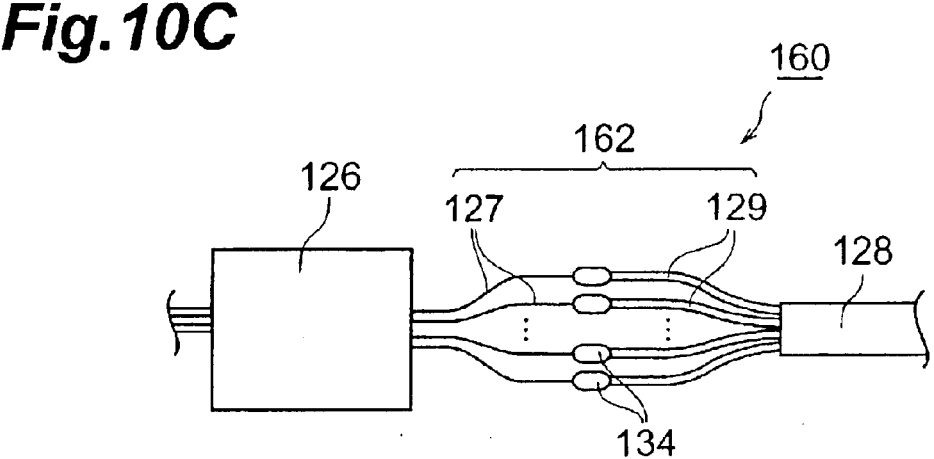
Figure 11:
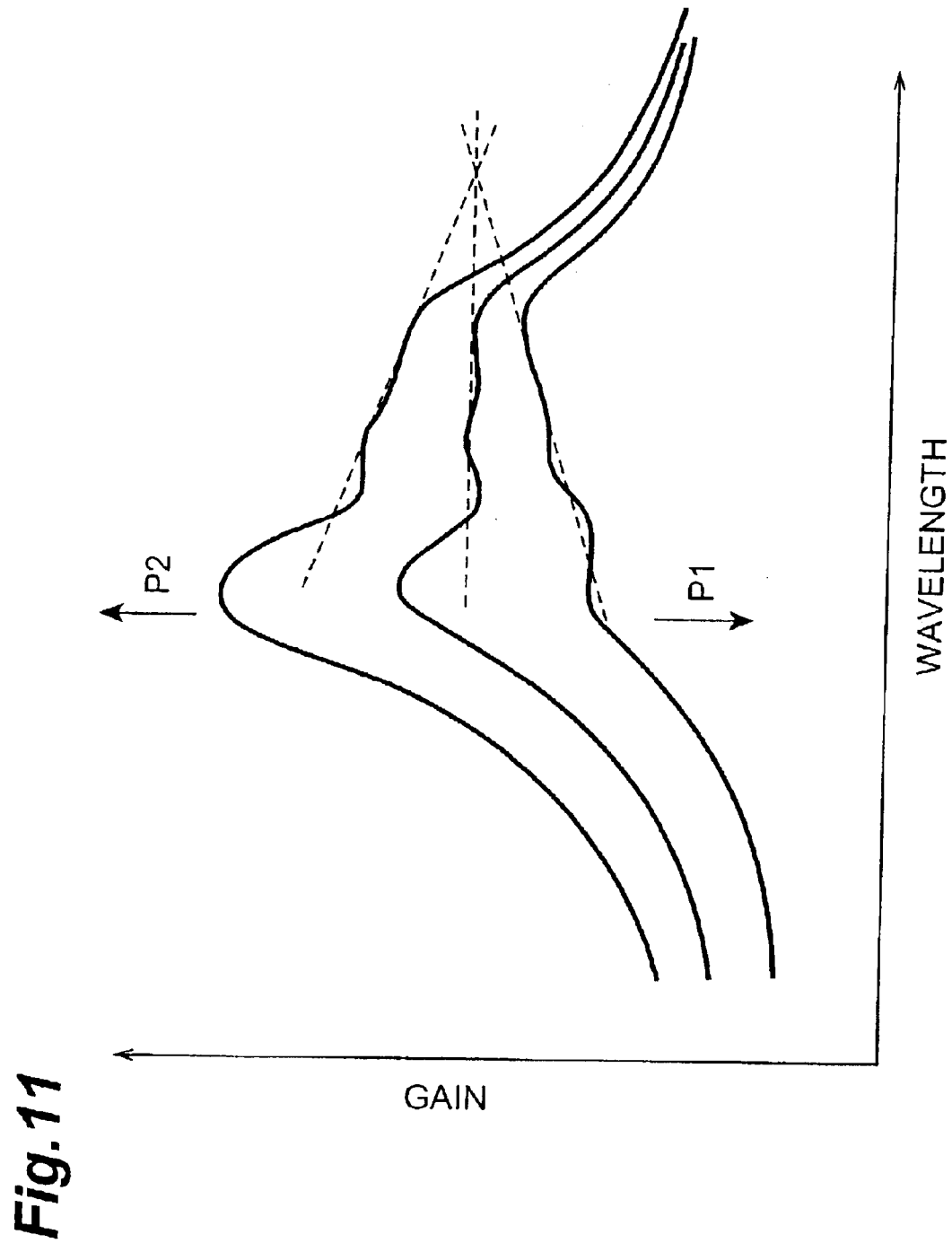
FIG. 11 is a graph showing the relationship between the wavelength and the gain to explain a gain tilt in an optical amplifier.

This optical transmission system has the connection unit 80 provided between the first optical fiber 104 and the second optical fiber 103 as shown in FIG. 1B and has an arrangement like the one shown in FIG. 1A. A similar effect can be obtained by connecting a loss adjusting section to an optical fiber in an optical cable or an optical fiber extending from an optical amp or providing a loss adjusting section at the connection portion between an optical fiber on the optical cable side and an optical fiber extending from an optical amp. FIGS. 10A to 10C show such cases.

In an optical transmission system (shown in only a partial section) 160 shown in FIG. 10A, an optical fiber 130 that can be connected to an optical fiber 129 in an optical cable 128 with a low connection loss is attached to the distal end of at least one of a plurality of optical fibers 127 extending from the optical amp 126. A loss adjusting section 131 is formed on an optical transmission line extending from this optical fiber 127 to the optical fiber 130. The loss adjusting section 131 has the same arrangement as that of the loss adjusting section 106 shown in FIGS. 2, 3A, 3B, 3C, 4A, 4B, and 5. The difference between the highest transmission loss and the lowest transmission loss among the transmission losses in the plurality of optical transmission lines 162 including the optical fibers 127 and 129, i.e., the transmission loss deviation, is set to 0.05 dB/km or less, and more preferably, 0.002 dB/km or less. With this setting, the powers of light propagating through all the optical transmission lines 162 and striking the optical amp 126 are almost equalized, and variations in gain tilt among the optical transmission lines 162 are suppressed, thus improving the transmission characteristics.

In the optical transmission system 160 shown in FIG. 10B, an optical fiber 132 that can be connected to the optical fiber 127 extending from the optical amp 126 with a low connection loss is attached to the distal end of at least one of the plurality of optical fibers 129 in the optical cable 128. A loss adjusting section 133 is formed on an optical transmission line extending from the optical fibers 129 to the optical fiber 132. The loss adjusting section 133 has the same arrangement as that of the loss adjusting section 106 shown in FIGS. 2, 3A, 3B, 3C, 4A, 4B, and 5. The difference between the highest transmission loss and the lowest transmission loss among the transmission losses in the plurality of optical transmission lines 162 including the optical fibers 127 and 129, i.e., the transmission loss, is set to 0.005 dB/km or less, and more specifically, 0.002 dB/km or less. With this setting, the powers of light propagating through all the optical transmission lines 162 and entering the optical amp 126 are almost equalized, and variations in gain tilt among the optical transmission lines 162 are suppressed, thus improving the transmission characteristics.

In the optical transmission system 160 shown in FIG. 10C (shown in only a partial section in FIG. 10C), the plurality of optical fibers 127 extending from the optical amp 126 are respectively connected to the plurality of optical fibers 129 in the optical cable 128 via a loss adjusting section 134. This loss adjusting section 134 has the same arrangement as that of the loss adjusting section 106 shown in FIGS. 2, 3A, 3B, 3C, 4A, 4B, and 5. The difference between the highest transmission loss and the lowest transmission loss among the transmission losses in the plurality of optical transmission lines 162 including the optical fibers 127 and 129, i.e., the transmission loss deviation, is set to 0.005 dB/km or less, and more preferably, 0.002 dB/km or less. With this setting as well, the powers of light propagating through all the optical transmission lines 162 and entering the optical amp 126 are almost equalized, and variations in gain tilt among the optical transmission lines 162 are suppressed, thus improving the transmission characteristics.

According to the embodiment described above, the influences of gain tilts in connection to an optical amp on transmission characteristics are suppressed. However, the present invention can be applied to a case wherein the influences of gain tilts on transmission characteristics pose a problem regardless of whether optical fibers are connected to an optical amp.

According to the connection unit, optical fiber line unit, optical cable, and optical transmission system according to the present invention, the powers of optical signals incident on an optical amplifier can be almost equalized. Since the powers of light incident on the optical fiber can be almost equalized, the adverse effect of gain tilts can be suppressed, thus improving the transmission characteristics.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber line comprising:
a first optical fiber having a first mode field diameter;
a second optical fiber having a second mode field diameter; and
an optical component having a third optical fiber including a third mode field diameter, a fourth optical fiber including a fourth mode field diameter, and a connection portion made by fusion-splicing said third and fourth optical fibers, a core portion of said fourth optical fiber being enlarged at said connection portion;
wherein said optical component is provided between said first and second optical fibers, said first and third optical fibers are fusion-spliced, and said second and fourth optical fibers are fusion-spliced, and
wherein said second mode field diameter is smaller than said first mode field diameter, and said fourth mode field diameter is smaller than said third mode field diameter.

2. An optical component provided between a first optical fiber having a first mode field diameter and a second optical fiber having a second mode field diameter small than said first mode field diameter, constituting an optical fiber line together with said first and second optical fibers, said optical component comprising:
a third optical fiber having a third mode field diameter;
a fourth optical fiber having a fourth mode field diameter; and
a connection portion made by fusion-splicing said third and fourth optical fibers;
wherein a core portion of said fourth optical fiber is enlarged at said connection portion, and
wherein said fourth mode field diameter is smaller than said third mode field diameter.

3. A method for making an optical fiber line comprising:
a step for providing an optical component between a first optical fiber having a first mode field diameter and second optical fiber having a second mode field diameter smaller than said first mode field diameter, said optical component having a third optical fiber including a third mode field diameter, a fourth optical fiber including a fourth mode field diameter smaller than said third mode field diameter, and a connection portion made by fusion-splicing said third and fourth optical fibers, a core portion of said fourth optical fiber being enlarged at said connection portion;
a step for fusion-splicing said first and third optical fibers; and
a step for fusion-splicing said second and fourth optical fibers.

* * * * *